US010136087B2

United States Patent
Iwasaki et al.

(10) Patent No.: US 10,136,087 B2
(45) Date of Patent: Nov. 20, 2018

(54) IMAGING APPARATUS AND IMAGING METHOD

(71) Applicant: Olympus Corporation, Hachioji-shi, Tokyo (JP)

(72) Inventors: Hiroaki Iwasaki, Hino (JP); Kazuya Hosono, Chofu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/372,816

(22) Filed: Dec. 8, 2016

(65) Prior Publication Data

US 2017/0094209 A1 Mar. 30, 2017

Related U.S. Application Data

(63) Continuation of application No. 15/058,516, filed on Mar. 2, 2016, now Pat. No. 9,549,132, which is a continuation of application No. PCT/JP2014/074632, filed on Sep. 18, 2014.

(30) Foreign Application Priority Data

Oct. 2, 2013 (JP) .................................. 2013-207772

(51) Int. Cl.
  *H04N 5/365* (2011.01)
  *H04N 5/361* (2011.01)
  *G06T 5/00* (2006.01)
  *H04N 5/217* (2011.01)
  *H04N 5/232* (2006.01)

(52) U.S. Cl.
  CPC ........... *H04N 5/3658* (2013.01); *G06T 5/002* (2013.01); *H04N 5/217* (2013.01); *H04N 5/23232* (2013.01); *H04N 5/23293* (2013.01); *H04N 5/361* (2013.01)

(58) Field of Classification Search
  CPC .................................................... H04N 5/3658
  USPC ............................................................ 348/243
  See application file for complete search history.

(56) References Cited

U.S. PATENT DOCUMENTS

2009/0285468 A1* 11/2009 Omi ........................ G06T 5/50
  382/132

FOREIGN PATENT DOCUMENTS

JP 2015-041879 A 3/2015

OTHER PUBLICATIONS

Office Action to corresponding Japanese Patent Application No. 2016-116015, dated Mar. 30, 2017 (3 pgs.).

* cited by examiner

*Primary Examiner* — Joel Fosselman
(74) *Attorney, Agent, or Firm* — John C. Pokotylo; Pokotylo Patent Services

(57) ABSTRACT

An imaging apparatus comprising: a dark image data imaging section that obtains dark image data in a state in which light beams entering an imaging surface of an image sensor are shielded before first image data is obtained or after second image data obtained lastly; and a correcting section that corrects a fixed pattern noise in cumulative relatively bright composite image data by using the dark image data, wherein the correcting section corrects the fixed pattern noise in the cumulative relatively bright composite image data by using the dark image data obtained at a time closest to the time in a temperature of the image sensor when the first image data or the second image data is obtained is assumed to be the highest, of the dark image data obtained before the first image data is obtained or the dark image data obtained after the second image data obtained lastly.

12 Claims, 5 Drawing Sheets

IMAGING APPARATUS AND IMAGING METHOD

CROSS-REFERENCE TO RELATED APPLICATIONS

This application is a continuation application of U.S. patent application Ser. No. 15/058,516 (referred to as "the '516 application" and incorporated herein by reference), filed on Mar. 2, 2016, titled "IMAGING APPARATUS AND IMAGING METHOD" and listing Hiroaki IWASAKI and Kazuya HOSONO as the inventors, the '516 application being a continuation application of PCT Application No. PCT/JP2014/074632, filed on Sep. 18, 2014, which is based upon and which claims the benefit of priority from prior Japanese Patent Application No. 2013-207772, filed on Oct. 2, 2013, the entire contents of all of which are incorporated herein by reference.

BACKGROUND OF THE INVENTION

1. Field of the Invention

The present invention relates to an electronic imaging apparatus such as a digital still camera, and in particular relates to an imaging apparatus and an imaging method capable of generating a bulb exposure image with relatively bright composition and relatively dark composition, and capable of arbitrarily adjusting exposure time.

2. Description of Related Art

Conventionally, with a single lens reflex type imaging apparatus, observing a subject image has been performed using an optical viewfinder. However, there has been recently known an imaging apparatus that eliminates an optical viewfinder and permits a user to observe a subject image through live view display for displaying an image that has been read out from an image sensor using a liquid crystal monitor or the like. In addition, instead of an optical viewfinder, imaging apparatuses have become available on the market that display an image through live view display using an electronic viewfinder that is separate from a liquid crystal monitor, and are capable of switching between the liquid crystal monitor and the electronic viewfinder.

Conventionally, regardless of whether an optical viewfinder or an electronic viewfinder is used, at the time of a prolonged exposure, such as with a bulb exposure, it was not possible to read out an image signal from the image sensor during exposure, which meant that it was not possible to confirm the state of the subject or exposure conditions during exposure, and an image could only be confirmed only upon completion of shooting. As a result, for the photographer, setting of exposure and exposure time and deciding when to start and stop the exposure need to be determined by the photographer themselves through estimation from subject brightness and the like, and it is not an easy matter to obtain a desired exposure image without insufficient exposure or over exposure.

Thus, an imaging apparatus that reads out a pixel signal from an image sensor at a predetermined time interval and displays an image obtained by simple cumulative addition on a liquid crystal monitor each time an image signal based on this pixel signal is read out of the image sensor is proposed. (See Japanese Patent Laid-Open No. 2005-117395 (hereinafter referred to as "Patent Literature 1").) According to this imaging apparatus, since the course of exposure is displayed during prolonged exposure such as bulb exposure, a failure of shooting can be reduced. Moreover, there is proposed an imaging apparatus in which an image signal is continuously read out of the image sensor, and a bulb exposure image is generated with relatively bright composition (a composition method in which brightness levels of each pixel of the image data are compared, and the pixel with larger brightness level is selected as the brightness level after the composition). (See Japanese Patent No. 4148586 (hereinafter referred to as "Patent Literature 2").)

In the bulb exposure, shooting is carried out by exposure for a long time from several seconds to several minutes (referred to as "long exposure shooting"). As characteristics of the image sensor, a dark current component is generated in a photodiode constituting a pixel of the image sensor during the long exposure shooting, and a fixed pattern noise is generated. A generation amount of the dark current varies for each pixel and increases in proportion to exposure time. Moreover, it tends to increase as a temperature of the image sensor is higher, which appears as a defect-state noise or uneven image density on an image.

This fixed pattern noise caused by the dark current is generated depending only on the image sensor temperature during exposure and exposure time, whether it is shooting in an exposure state with a shutter open or shooting in a light-shielded state. Thus, in the digital camera currently available on the market, FPN (Fixed Pattern Noise) cancellation processing is executed in which, in bulb exposure, if a user performs shooting (an image taken at this time is referred to as a "bright image"), a light-shielded image is automatically shot at the same shutter speed in a state in which the shutter is closed after this shooting is finished, and the bright image data and the light-shielded image data are subjected to subtraction processing in an image processing circuit in a rear stage of the image sensor so as to correct the fixed pattern noise.

However, when a user performs bulb exposure using the imaging apparatus described in Patent Literatures 1 and 2 or the digital camera recently available on the market, the user starts shooting after shooting setting such as check of composition, focusing and the like while checking an image displayed through live-view display before the shooting. Moreover, in order that the user can concentrate on shooting including composition setting without feeling a sense of discomfort caused by seeing the live-view display and directly seeing the subject with the naked eye, the image is displayed at a high-speed frame rate (30 frames, 60 frames, or more, per second) from the image sensor for the live view. This causes the temperature of the image sensor to increase.

On the other hand, when the bulb exposure is started, the number of times of the reading-out operation from the image sensor is reduced during an exposure operation, and an operation with suppressed power consumption for a part of circuits in the image sensor is performed and thus, the consumed power, that is, heat generation from the image sensor is considerably suppressed as compared with the operation in the live view. Moreover, during a period when image reading-out is not carried out, processing is not executed in the image processing circuit or display of the live-view image is not updated, either, and thus, heat generation in the camera as a whole is suppressed. Thus, if shooting is performed in a place without a change in an environmental temperature, the temperature is high at start of the bulb exposure and the temperature tends to decrease as the exposure continues.

With the imaging apparatus described in Patent Literatures 1 and 2 and the digital camera with live-view function available on the market, since a dark image is shot after shooting of the bright image, the dark image is shot in a state in which the temperature of the image sensor is low. Since the dark current causing the fixed pattern noise increases as the temperature of the image sensor becomes higher, the bright image has a larger fixed pattern noise than the dark image, and it cannot be corrected even if the FPN cancellation processing is executed.

SUMMARY OF THE INVENTION

The present invention has an object to provide an imaging apparatus and an imaging method in which an image quality is improved by performing correction so that a correction effect of the FPN cancellation is improved when a bulb exposure image is generated through comparison and composition (relatively bright composition or relatively dark composition) of an image signal continuously read out of an image sensor.

An imaging apparatus according to a first aspect of the present invention is an imaging apparatus that repeatedly and sequentially performs relatively bright composition processing on second image data in a second frame and after generated on the basis of image data read out of an image sensor, the relatively bright composition processing storing first image data generated first on the basis of the image data read out of the image sensor as cumulative relatively bright composite image data, comparing respective corresponding pixel data of a plurality of pieces of pixel data constituting the second image data generated on the basis of the image data read out of the image sensor and of a plurality of pieces of pixel data constituting the cumulative relatively bright composite image data, and reconstructing the cumulative relatively bright composite image data using the larger pixel data as new pixel data, the imaging apparatus comprising: a dark image data imaging section that obtains dark image data in a state in which light beams entering an imaging surface of the image sensor are shielded before the first image data is obtained or after the second image data obtained lastly; and a correcting section that corrects a fixed pattern noise in the cumulative relatively bright composite image data by using the dark image data, wherein the correcting section corrects the fixed pattern noise in the cumulative relatively bright composite image data by using dark image data obtained at a time closest to the time in a temperature of the image sensor when the first image data or the second image data is obtained is assumed to be the highest, of the dark image data obtained before the first image data is obtained or the dark image data obtained after the second image data obtained lastly.

An imaging apparatus according to a second aspect of the present invention is an imaging apparatus that repeatedly and sequentially performs relatively dark composition processing on second image data in a second frame and after generated on the basis of image data read out of an image sensor, the relatively dark composition processing storing first image data generated first on the basis of the image data read out of the image sensor as cumulative relatively dark composite image data, comparing respective corresponding pixel data of a plurality of pieces of pixel data constituting the second image data generated on the basis of the image data read out of the image sensor and of a plurality of pieces of pixel data constituting the cumulative relatively dark composite image data, and reconstructing the cumulative relatively dark composite image data using the smaller pixel data as new pixel data, the imaging apparatus comprising: a dark image data imaging section that obtains dark image data in a state in which light beams entering an imaging surface of the image sensor are shielded before the first image data is obtained or after the second image data obtained lastly; and a correcting section that corrects a fixed pattern noise in the cumulative relatively dark composite image data by using the dark image data, wherein the correcting section corrects the fixed pattern noise in the cumulative relatively dark composite image data by using dark image data obtained at a time closest to the time in a temperature of the image sensor when the first image data or the second image data is obtained is assumed to be the lowest, of the dark image data obtained before the first image data is obtained or the dark image data obtained after the second image data obtained lastly.

An imaging method according to a third aspect of the present invention is an imaging method that repeatedly and sequentially performs relatively bright composition processing on second image data in a second frame and after generated on the basis of image data read out of an image sensor, the relatively bright composition processing storing first image data generated first on the basis of the image data read out of the image sensor as cumulative relatively bright composite image data, comparing respective corresponding pixel data of a plurality of pieces of pixel data constituting the second image data generated on the basis of the image data read out of the image sensor and of a plurality of pieces of pixel data constituting the cumulative relatively bright composite image data, and reconstructing the cumulative relatively bright composite image data using the larger pixel data as new pixel data, the imaging method comprising: a dark image data imaging step of obtaining dark image data in a state in which light beams entering an imaging surface of the image sensor are shielded before the first image data is obtained or after the second image data obtained lastly; and a correcting step of correcting a fixed pattern noise in the cumulative relatively bright composite image data by using the dark image data, wherein the correcting step corrects the fixed pattern noise in the cumulative relatively bright composite image data by using dark image data obtained at a time closest to the time in a temperature of the image sensor when the first image data or the second image data is obtained is assumed to be the highest, of the dark image data obtained before the first image data is obtained or the dark image data obtained after the second image data obtained lastly.

An imaging method according to a fourth aspect of the present invention is an imaging method that repeatedly and sequentially performs relatively dark composition processing on second image data in a second frame and after generated on the basis of image data read out of an image sensor, the relatively dark composition processing storing first image data generated first on the basis of the image data read out of the image sensor as cumulative relatively dark composite image data, comparing respective corresponding pixel data of a plurality of pieces of pixel data constituting the second image data generated on the basis of the image data read out of the image sensor and of a plurality of pieces of pixel data constituting the cumulative relatively dark composite image data, and reconstructing the cumulative relatively dark composite image data using the smaller pixel data as new pixel data, the imaging method comprising: a dark image data imaging step of obtaining dark image data in a state in which light beams entering an imaging surface of the image sensor are shielded before the first image data is obtained or after the second image data obtained lastly; and a correcting step of correcting a fixed pattern noise in the cumulative relatively dark composite image data by using the dark image data, wherein the correcting step corrects the fixed pattern noise in the cumulative relatively dark composite image data by using dark image data obtained at a time closest to the time in a temperature of the image sensor when the first image data or the second image data is obtained is assumed to be the lowest, of the dark image data obtained before the first image data is obtained or the dark image data obtained after the second image data obtained lastly.

DETAILED DESCRIPTION OF THE PREFERRED EMBODIMENTS

A preferred embodiment will be described below by using a camera to which the present invention is applied. A camera according to the preferred embodiment of the present invention is a digital camera and in summary, it live-view displays image data based on image data read out of an image sensor (image sensor 4) on a display section and also records the image data image-processed for recording in accordance with an operation of a release button in an external memory. Moreover, it carries out FPN correction by subtracting a dark image obtained in a state in which light beams entering an imaging surface of the image sensor are shielded from a bright image at shooting. In carrying out this FPN correction, timing to obtain a dark image is adjusted so that a temperature when the bright image to be corrected is obtained is equal to a temperature when the dark image is obtained as much as possible.

Figure 2:
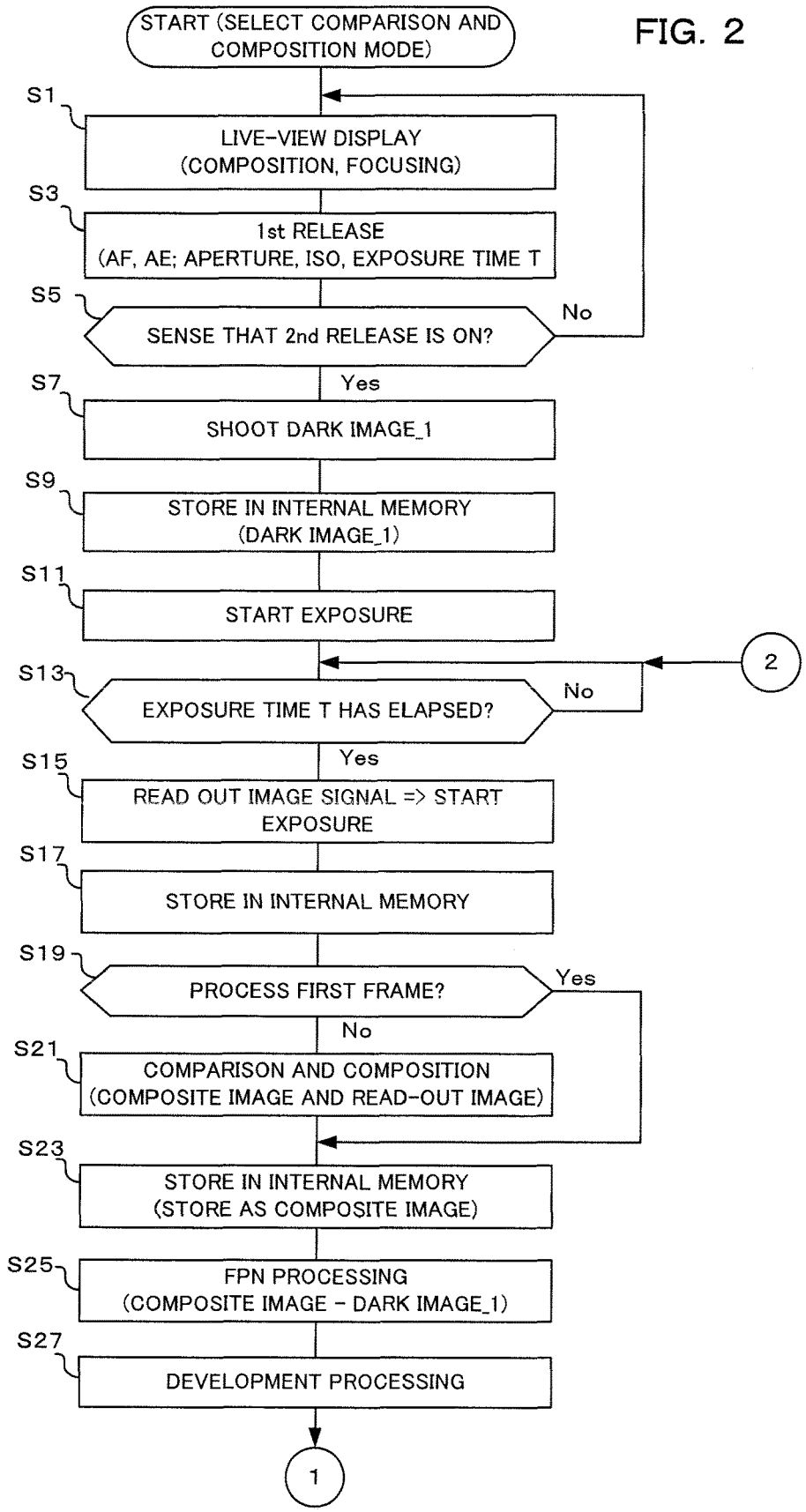
FIG. 2 is a flowchart illustrating an operation when a comparison and composition mode is set in the camera according to the embodiment of the present invention.

That is, in this embodiment, when a bulb exposure image is to be generated by comparison and composition of an image signal continuously read out of an image sensor 4, if the relatively bright composition (image composition in which brightness levels are compared for each pixel of the image data and the larger one (brighter one) is selected and used as the brightness level after composition) is carried out as comparison and composition (see S21 in FIG. 2), the FPN cancellation is carried out by using a dark image shot before shooting of the bright image (see S25 in FIG. 2). Please note that "relatively bright composition," as just described, is not to be confused with "bright image," which is an image taken in an unshielded (e.g., mechanical shutter open) state). Moreover, if the relatively dark composition (image composition in which brightness levels are compared for each pixel of the image data and the smaller one (darker one) is selected and used as the brightness level after composition) is carried out as comparison and composition, a fixed pattern noise of a composite image is corrected with accuracy by carrying out the FPN cancellation by using the dark image shot after shooting of the bright image so as to improve an image quality (see S41 in FIG. 3). Please note that "rela-tively dark composition," as just described, is not to be confused with "dark image," which is an image taken in a light shielded (e.g., mechanical shutter closed) state. Moreover, the FPN cancellation is carried out also for an image in the middle of composition by using the dark image shot before shooting of the bright image so that the image qualities of the live-view display and a recorded image in the course of exposure are also improved (see S25 in FIG. 2 and S31 in FIG. 3).

Figure 1:
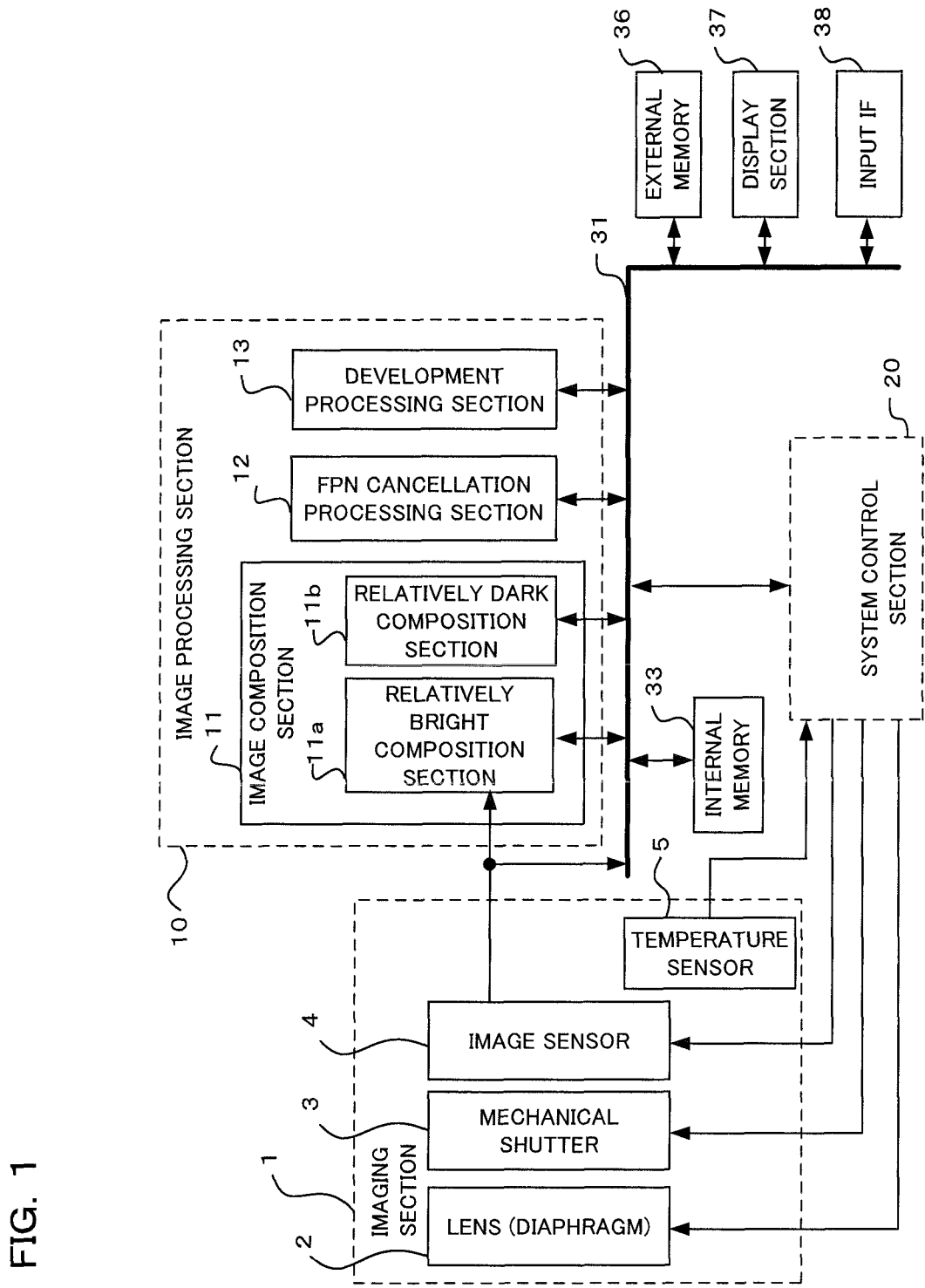
FIG. 1 is a block diagram mainly illustrating electric constitution of a camera according to an embodiment of the present invention.

FIG. 1 is a block diagram mainly illustrating electric constitution of a camera according to an embodiment as the preferred embodiment of the present invention. The camera in this embodiment has an imaging section 1, an image processing section 10, a system control section 20, and a bus 31 as well as each section connected thereto. In this embodiment, a lens 2 is integrally constituted with the camera body but it may be naturally a replaceable lens.

In the imaging section 1, the lens 2, a mechanical shutter 3, an image sensor 4, and a temperature sensor 5 are provided. The lens 2 forms an optical image of a subject on the image sensor 4. In this lens 2, a diaphragm determining an aperture value for adjusting an exposure amount is provided. Moreover, the mechanical shutter 3 exposes or shields light to the image sensor 4 by an opening and closing operation and controls shutter speed. By closing the mechanical shutter 3, the image sensor 4 is shielded, and the image data obtained in this state is referred to as dark image data.

The image sensor 4 includes an image sensor such as a CMOS image sensor or a CCD image sensor, converts an optical image of the subject formed by the lens 2 to an electric signal for each pixel and outputs the image data to the image processing section 10 and the bus 31. The bus 31 is a signal line for performing transmission/reception of a signal between each block. The mechanical shutter 3 and the image sensor 4 function as a dark image data imaging section for obtaining dark image data in a state in which the light beams entering an imaging surface of the image sensor 4 are shielded before first image data (the first image data is image data generated first on the basis of the image data read out of the image sensor 4) is obtained or after second image data (the second image data is image data generated on the basis of image data read out of the image sensor 4 after first image data is generated) obtained lastly.

The temperature sensor 5 is arranged in the vicinity of the image sensor 4 and outputs a signal according to an ambient temperature of the image sensor 4 to the system control section 20. As will be described later, the temperature sensor 5 outputs temperature data when the first image data generated first on the basis of the image data readout of the image sensor 4 is obtained, and when the second image data generated lastly on the basis of the image data read out of the image sensor 4 is obtained at least to the system control section 20.

The image processing section 10 applies image process-ing to the image data output from the image sensor 4. The image processing section 10 has an image composition section 11, an FPN cancellation processing section 12, and a development processing section 13. A function of each section in the image processing section 10 may be realized by a hardware circuit, may be realized by a circuit executed by a program code such as DSP (Digital Signal Processor) or may be realized by a CPU (Central Processing Unit) and a peripheral circuit as well as a program code.

The image composition section 11 has a relatively bright composition section 11a and a relatively dark composition section 11b, compares outputs for respective corresponding pixels in the images continuously read out of the image sensor 4 or the image data stored in an internal memory 33 and generates a composite image by relatively bright composition processing and relatively dark composition processing for each pixel.

The relatively bright composition section 11a executes relatively bright composition processing as follows. First, pixel data constituting the image data read out of the image sensor 4 is stored as cumulative relatively bright composite image data in the internal memory 33. Next, when the image data is read out of the image sensor 4, the relatively bright composition section 11a compares the respective corresponding pixel data for the pixel data constituting the read-out image data and a plurality of pieces of pixel data constituting the cumulative relatively bright composite image data stored in the internal memory 33. Then, in accordance with a result of comparison of the respective corresponding pixel data, the larger one, that is, the brighter pixel data is detected, and by using this brighter pixel data, the cumulative relatively bright composite image data is reconstructed. This processing is repeatedly executed each time the image data is read out of the image sensor 4. If the relatively bright composition processing is executed in the case of shooting a photo of a celestial body, for example, an image of light trails of stars in the night sky can be obtained.

The relatively dark composition section 11b executes the relatively dark composition processing as follows. First, pixel data constituting the image data read out of the image sensor 4 is stored in the internal memory 33 as cumulative relatively dark composite image data. Next, when the image data is read out of the image sensor 4, the relatively dark composition section 11b compares respective corresponding pixel data for the pixel data constituting the read-out image data and a plurality of pieces of pixel data constituting the cumulative relatively dark composite image data stored in the internal memory 33. Then, as the result of comparison of the respective corresponding pixel data, the smaller one, that is, the darker pixel data is detected, and by using this darker pixel data, the cumulative relatively dark composite image data is reconstructed. If the relatively dark composition processing is executed when a photo of a celestial body is shot, for example, light trails of stars in the night sky are erased, and an image of a background can be obtained.

The FPN cancellation processing section 12 executes subtraction processing of outputs of each pixel data of a bright exposure image (exposure image shot when the mechanical shutter 3 is open) and a dark exposure image (an image shot when the mechanical shutter 3 is closed for obtaining dark image data) and corrects a fixed pattern noise. The FPN cancellation processing section 12 functions as a correcting section for correcting the fixed pattern noise in the cumulative relatively bright composite image data by using the dark image data. This correcting section corrects the fixed pattern noise in the cumulative relatively bright composite image data by using the dark image data obtained at a time closest to the time when a temperature of the image sensor when the first image data or the second image data is obtained is assumed to be the highest in dark image data obtained before the first image data (image data generated first after the shutter is opened) is obtained or the dark image data obtained after the second image data obtained lastly (image data generated lastly while the shutter is open).

Moreover, the FPN cancellation processing section 12 functions as a correcting section for correcting the fixed pattern noise in the cumulative relatively dark composite image data by using the dark image data. This correcting section corrects the fixed pattern noise in the cumulative relatively dark composite image data by using the dark image data obtained at a time closest to the time when the temperature of the image sensor when the first image data or the second image data is obtained is assumed to be the lowest in dark image data obtained before the first image data is obtained or the dark image data obtained after the second image data obtained lastly.

The development processing section 13 performs development processing such as demosaicing, white balance adjustment, gamma correction, and image compression on RAW image data generated in the image composition section 11.

To the bus 31, in addition to the aforementioned image processing section 10, the internal memory 33, an external memory 36, a display section 37, an input IF (Interface) 38, and the system control section 20 are connected.

The internal memory 33 temporarily stores various setting information required for a camera operation and the image data in the course of image processing. The internal memory 33 is constituted by a non-volatile memory such as a flash memory or an SDRAM.

The external memory 36 is a non-volatile storage medium detachably loaded in the camera body or fixed to an inside thereof and is an SD card, a CF card or the like, for example. This external memory 36 records the image data developed by the development processing section 13 and during playback, the recorded image data is read out and can be output to the outside of the camera.

The display section 37 has a rear-surface display section such as TFT (Thin Film Transistor) liquid crystal or an organic EL and an EVF (electronic viewfinder) and displays an image developed by the development processing section 13.

The input IF 38 has an operation member such as a release button and a touch panel or the like for inputting a touch operation in the rear-surface display section or the like and sets various modes and gives instructions of an exposure operation such as release on the basis of a user operation.

The system control section 20 has a CPU (Central Processing Unit) and a peripheral circuit and executes entire control by controlling each section of the camera in accordance with a program stored in the internal memory 33.

Moreover, the system control section 20 executes entire control of the aforementioned relatively bright composition processing. In this relatively bright composition processing, the relatively bright composition processing of storing the first image data generated first on the basis of the image data read out of the image sensor 4 as the cumulative relatively bright composite image data and then, of comparing respective corresponding pixel data of a plurality of pieces of pixel data constituting the second image data generated on the basis of the image data read out of the image sensor 4 and a plurality of pieces of pixel data constituting the cumulative relatively bright composite image data, and of reconstructing the cumulative relatively bright composite image data using the larger (brighter) pixel data as new pixel data is sequentially and repeatedly performed on the second image data in the second frame and after generated on the basis of the image data read out of the image sensor.

Moreover, the system control section 20 executes entire control of the aforementioned relatively dark composition processing. In this relatively dark composition processing, the relatively dark composition processing of storing the first image data generated first on the basis of the image data read out of the image sensor 4 as the cumulative relatively dark composite image data and then, of comparing respective corresponding pixel data of a plurality of pieces of pixel data constituting the second image data generated on the basis of the image data read out of the image sensor 4 and a plurality of pieces of pixel data constituting the cumulative relatively dark composite image data, and of reconstructing the cumulative relatively dark composite image data using the smaller (darker) pixel data as new pixel data is sequentially and repeatedly performed on the second image data in the second frame and after generated on the basis of the image data read out of the image sensor.

Next, an outline of an operation of the camera illustrated in FIG. 1 will be described. On the basis of control by the system control section 20, adjustment of a focus lens constituting the lens 2 is carried out, an aperture is set to a predetermined value, the mechanical shutter 3 is opened, and an optical image is converted to an electric signal by the image sensor 4. The image data read out of the image sensor 4 is subjected to predetermined image processing in the image processing section 10 and is stored in the external memory 36. Moreover, the image data subjected to the predetermined image processing in the image processing section 10 is resized and then, displayed on the display section 37.

The system control section 20 receives an instruction from the user through the input IF 38 and carries out timing control such as exposure start of the image sensor 4, and signal reading-out, opening/closing timing control of the mechanical shutter 3, aperture control of the lens 2 and auto focusing control. Moreover, the system control section 20 receives the image data from the image processing section 10 and carries out control such as image display by the display section 37 and storage of the image data in the external memory 36.

Next, by using the flowcharts illustrated in FIGS. 2 and 3, a flow of processing of the camera according to this embodiment will be described. These flowcharts are executed when the system control section 20 controls each section in accordance with a program stored in the internal memory 33.

In these flowcharts, a sequence when a user selects a bulb exposure mode through the input IF 38 and also selects the comparison and composition mode in the bulb exposure mode is illustrated. Even in the bulb exposure mode, normal bulb exposure where progress display is not carried out during exposure and additive composition display mode where progress display is carried out during exposure with added images, have been omitted, while an operation of progress display of subjecting the image data continuously read out to comparison and composition and of sequentially displaying as a course of exposure will be described. The comparison and composition includes relatively bright composition and relatively dark composition. It is made possible to perform selection in accordance with an exposure intention of the user. Regarding internal processing of the camera, the relatively bright composition and the relatively dark composition may be carried out in parallel at the same time. If the relatively bright composition mode is set, brightness of a background is constant regardless of exposure time, and a length of light trails can be adjusted in accordance with the exposure time and if the relatively dark composition mode is set, moving light trails are erased, and only a background image is left.

When entering the flow illustrated in FIG. 2, first, live-view display is performed (S1). At this Step, the mechanical shutter 3 is brought into an open state, and on the basis of the image data read out of the image sensor 4 at a predetermined frame rate, the live-view display is performed on the display section 37. When the live-view display is performed, the user confirms the live-view image (or a subject image by the optical viewfinder) and adjusts a direction of the camera, a focusing distance (zoom) of the lens 2, and focusing so that a subject to be shot can be shot. Moreover, the user can set the progress display mode, the relatively bright composition mode, the relatively dark composition mode or the like through the input IF section 38 such as an operation button or a touch panel as necessary.

Once the live-view display is performed, then, processing when a 1st release is carried out is executed (S3). Here, the system control section 20 determines a state of a 1st release switch which is turned on by half-pressing of a release button, and if it is on, AF (automatic focusing control) and AE (automatic exposure control) are carried out. In the AF, driving control of the focus lens in the lens 2 is executed and focusing is performed so that a contrast signal based on an image signal repeatedly read out of the image sensor 4 becomes a maximum value. Moreover, in the AE, an aperture value, ISO sensitivity, and exposure time T are automatically controlled so that an output of the image signal repeatedly read out of the image sensor 4 becomes a proper level. Depending on the setting of the camera, both or either one of the AF and AE functions is turned off, and the user may manually set a position of the focus lens (focusing), an aperture value, ISO sensitivity, exposure time T and the like through the input IF 38 or the like.

Once the 1st release processing is executed, then, it is determined whether a 2nd release is on or not (S5). When composition and focusing are right, the user presses on the release button in order to start shooting and at this Step, it is determined whether the 2nd release switch interlocking with the release button is turned on. As the result of this determination, if it is not on, the process returns to Step S1 to repeatedly carry out the live-view display and the AF and AE operations are performed each time the 1st release switch is turned on until the 2nd release switch is turned on.

As the result of the determination at Step S5, if the 2nd release switch is turned on, bulb exposure is started at Step S7 and after. First, dark image_1 exposure is carried out (S7). Here, the system control section 20 closes the mechanical shutter 3 and shoots the dark image_1 in a shielded state with the exposure time T.

Once the dark image_1 is shot, then, the image data of the dark image_1 is stored in the internal memory (S9). Here, the image data of the dark image_1 shot at Step S7 is read out of the image sensor 4 and stored in the internal memory 33. This stored dark image data is used for the FPN processing later (see S21 and S41).

Once the image data of the dark image_1 is stored in the internal memory 33, then, exposure is started (S11). Here, the system control section 20 opens the mechanical shutter 3, the image sensor 4 starts exposure of the first frame, and a timer for counting the exposure time is reset to start a time counting operation.

When the exposure is started, then, it is determined whether the exposure time T has elapsed or not (S13). The exposure time T is an image reading-out cycle (exposure time) of the image sensor and is manually set by the user in advance or automatically set by the AE function. In the case of the first frame, it is determined on the basis of the elapsed time of the timer which started the time counting operation at Step S11, while in the case of the second frame and after, it is determined on the basis of the elapsed time of the timer which started the time counting operation at Step S15 which will be described later. As the result of this determination, if the exposure time T has not elapsed, elapse of the exposure time T is awaited while exposure is continued.

As the result of the determination at Step S13, if the exposure time T has elapsed, the image signal is read out, and the exposure is resumed (S15). Here, the system control section 20 reads out the image signal from the image sensor 4 and after reading-out of the image signal is finished, it resumes exposure. In resuming the exposure, the mechanical shutter 3 is kept open, and accumulation of the image signal is resumed by electronic shutter control of the image sensor 4. Moreover, the timer for counting the exposure time is reset to resume the time counting operation.

Moreover, at Step S15, when the image signal is read out, it is stored in the internal memory (S17). At this Step, the image signal read out of the image sensor 4 is stored as digital image data in the internal memory 33. When recording of the image data in the internal memory 33 and reading-out are completed at the same time, exposure of the subsequent frame has been started without a time gap. Thus, exposure falling between continuously taken images can be minimized, and discontinuation of light trails of the finally combined image can be minimized. Since a CMOS image sensor generally used as an image sensor of the digital camera can perform reading-out per line and sequentially control exposure start, time of exposure falling between continuous frames becomes approximately reading-out time of one line. Since this time is as extremely short as approximately several 10 to 100 microseconds, the image is not visually recognized as an image with discontinuation of light trails.

At Step S17, when the image signal is stored in the internal memory, then, it is determined whether the first frame is processed or not (S19). Since the comparison and composition processing is performed after obtaining the image data of the second frame, it is determined whether the image data of the first frame is obtained or the image data of the second frame or after is obtained. As the result of the determination at Step S19, if the first frame is processed, the process proceeds to Step S23, and the composition processing is not performed.

As the result of the determination at Step S19, if the first frame is not processed (that is, the second or later frame is processed), then, comparison and composition are carried out from the composite image and the read-out image (S21). Here, the relatively bright composition processing and the relatively dark composition processing (it may be only either one of them) is carried out in accordance with the setting of the user. Here, assume that it is immediately after the image data of the second frame is read out, the image data of the first frame and the second frame are temporarily stored in the internal memory 33. The system control section 20 compares pixel outputs of the same address of the two images by using the read-out image data of the first frame and the second frame temporarily stored in the internal memory 33, selects the larger pixel data as the pixel data of the image after composition and makes it the relatively bright composite image data (cumulative relatively bright composite image data). Moreover, it compares the pixel outputs of the same address of the two images, selects the smaller pixel data as the pixel data of the image after the composition and makes it the relatively dark composite image data (cumulative relatively dark composite image data). In the third frame and after, similarly, using the image data read out of the image sensor 4 and the cumulative relatively bright composite image data or the cumulative relatively dark composite image data stored in the internal memory 33 so far, the relatively bright composition processing/relatively dark composition processing is carried out. Details of the comparison and composition processing will be described later.

Once the comparison and composition processing is carried out at Step S21, then, it is stored in the internal memory (S23). Here, in the case of the first frame, the image signal read out at Step S15 is stored, while in the case of the second frame and after, the image data of the composite image subjected to the comparison and composition processing at Step S21 is stored.

Once it is stored in the internal memory, then, FPN processing is carried out (S25). Here, in the FPN cancellation processing section 12, by using the composite image data stored in the internal memory 33 and the image data of the dark image_1 obtained at Steps S7 and S9, for a plurality of pieces of pixel data constituting the composite image and a plurality of pieces of pixel data constituting the dark image_1, a difference between the respective corresponding pixel data (composite image−dark image_1) is calculated.

Once the FPN processing is carried out, then, development processing is carried out (S27). Here, for the image data stored in the internal memory 33 (the image data of the first frame or the image data of the composite image), the development processing section 13 applies development processing such as demosaicing processing, γ correction processing, noise reduction processing, YC signal generation processing, and resizing processing. The resizing processing is carried out in order to match the number of pixels of the image signal read out of the image sensor 4 with the number of display pixels of a display monitor since the number of pixels of the image signal is larger than that of the display pixels of the display monitor of the display section 37.

Once the development processing is carried out, then, the developed image is displayed (S31). Here, an image based on the image data subjected to the development processing at Step S27 is displayed on the display section 37. At Step S13, each time the exposure time T has elapsed, the composition-processed image is displayed as an exposure elapsed image and thus, the user can confirm the image on which exposure gradually progresses by the prolonged exposure. When the developed image is displayed, the RAW image data subjected to the FPN processing and the development-processed image data may be stored as the image data being processed in the external memory 36.

Once development display is performed, then, whether the 2nd release has been turned off or not is sensed (S33). If the user starts bulb exposure by pressing on the release button at Step S5 and then finishes the bulb exposure, the user releases pressing on the release button. Then, at this Step, it is determined whether or not the release switch has been turned off. As the result of this determination, if it has not been turned off (in the case of on), the process returns to Step S13 to reset the timer at Step S15, and then, when the time T has elapsed, executes the processing at Steps S15 to S31.

As the result of determination at Step S33, if the 2nd release is off, even if the exposure time T has not elapsed, exposure is finished at the timing of turning-off. Thus, reading-out of the image data from the image sensor 4 is not performed but the cumulative composite image data stored in the internal memory 33 is processed. If the 2nd release switch is determined to be off, first, it is determined whether the comparison and composition method set by the user is the relatively bright composition or the relatively dark composition (S35). Whether it is the relatively bright composition or the relatively dark composition is determined on the basis of a setting state at this Step since the user sets it through the input IF 38. If both the relatively bright composition and the relatively dark composition are set, different processing is applied to each of the composite images.

As the result of the determination at Step S35, if the relatively bright composition is set, a result obtained by subtracting the dark image_1 from the final composite image is stored in the external memory (S45). Since the relatively bright composition is performed at Step S21 each time the image data is read out of the image sensor 4, at this Step, the image data of the final composite image by the relatively bright composition stored in the internal memory 33 is stored in the external memory 36.

As the result of the determination at Step S35, if the relatively dark composition is set, at Steps S37 to S43, the FPN processing is performed on the image data of the relatively dark composition. First, a dark image_2 is shot (S37). Here, the system control section 20 closes the mechanical shutter 3 and shoots the dark image_2 in the shielded state with the exposure time T.

Once the dark image_2 is shot, then, the image data of the dark image_2 is stored in the internal memory (S39). Here, the image data of the dark image_2 shot at Step S39 is read out of the image sensor 4 and is stored in the internal memory 33.

Once it is stored in the internal memory, then, the FPN processing is carried out by subtracting the dark image_2 from the final composite image (S41). Here, subtraction calculation is performed between the respective corresponding pixel data for the image data of the dark image_2 shot at Step S37 from the image data of the final composite image generated by the relatively dark composition and stored in the internal memory 33 at Step S23.

Once the FPN processing is carried out, it is stored in the external memory (S43). Here, the image data subjected to the FPN processing at Step S41 is stored in the external memory 36 as the final exposure image data.

Once it is stored in the external memory at Step S43 or Step S45, the recorded image is displayed (S47). Here, an image based on the exposure image data stored in the external memory 36 is displayed on the display section 37. Once the recorded image is displayed, the operation in the comparison and composition mode is finished.

As described above, in the flowcharts illustrated in FIGS. 2 and 3, when the relatively bright composition is carried out, before the image data is obtained first, the dark image data (the image data of the dark image_1, S7 and S9) is made the dark image data obtained at a time closest to the time when the temperature of the image sensor 4 is assumed to be the highest, and by using this dark image data, the fixed pattern noise in the cumulative relatively bright composite image data is corrected (see S25 and S45).

Moreover, when the relatively dark composition is carried out, after the image data is obtained lastly, the dark image data (the image data of the dark image_2, S37 and S39) is made the dark image data obtained at a time closest to the time when the temperature of the image sensor 4 is assumed to be the lowest, and by using this dark image data, the fixed pattern noise in the cumulative relatively dark composite image data is corrected (see S41 and S43).

Next, the comparison and composition processing is described. It is assumed here that a two-dimensional address of the image data is (x, y), and the N-th read-out image (N is an integer) is N(x, y). Assuming that a composite image up to the N−1-th composite image is N−1_com(x, y), a comparison and composite image N_com(x, y) is obtained by comparison of output data of the addresses (x, y) of N(x, y) and N−1_com(x, y). Here, x is the number of pixels in the x-direction of the image sensor starting from one, and y is the number of pixels in the y-direction starting from one.

In the relatively bright composition at this time, sizes of the pixel outputs N(x, y) and N−1_com(x, y) of the same address are compared, and the larger (brighter) one is selected and made a pixel output of the composite image N_com(x, y). If the sizes are equal, the value is reflected.

Moreover, in the relatively dark composition, the sizes of the pixel outputs N(x, y) and N−1_com(x, y) of the same address are compared, and the smaller (darker) one is selected and made a pixel output of the composite image N_com(x, y). If the sizes are equal, the value is reflected.

Next, by using FIGS. 4 and 5, the comparison and composition processing will be described. In the both figures, the uppermost column illustrates a temporal change of the temperature in the vicinity of the image sensor 4. The second column illustrates an operation of the image sensor 4 (image sensor) and the next column illustrates a temporal change of the comparison and composition processing. In this column, "S" indicates the relatively bright composition processing and "−" indicates the FPN cancellation processing. The next column of the image processing indicates a temporal change of the display image and the next column of the display image indicates a temporal change of the recorded image.

Figure 4:
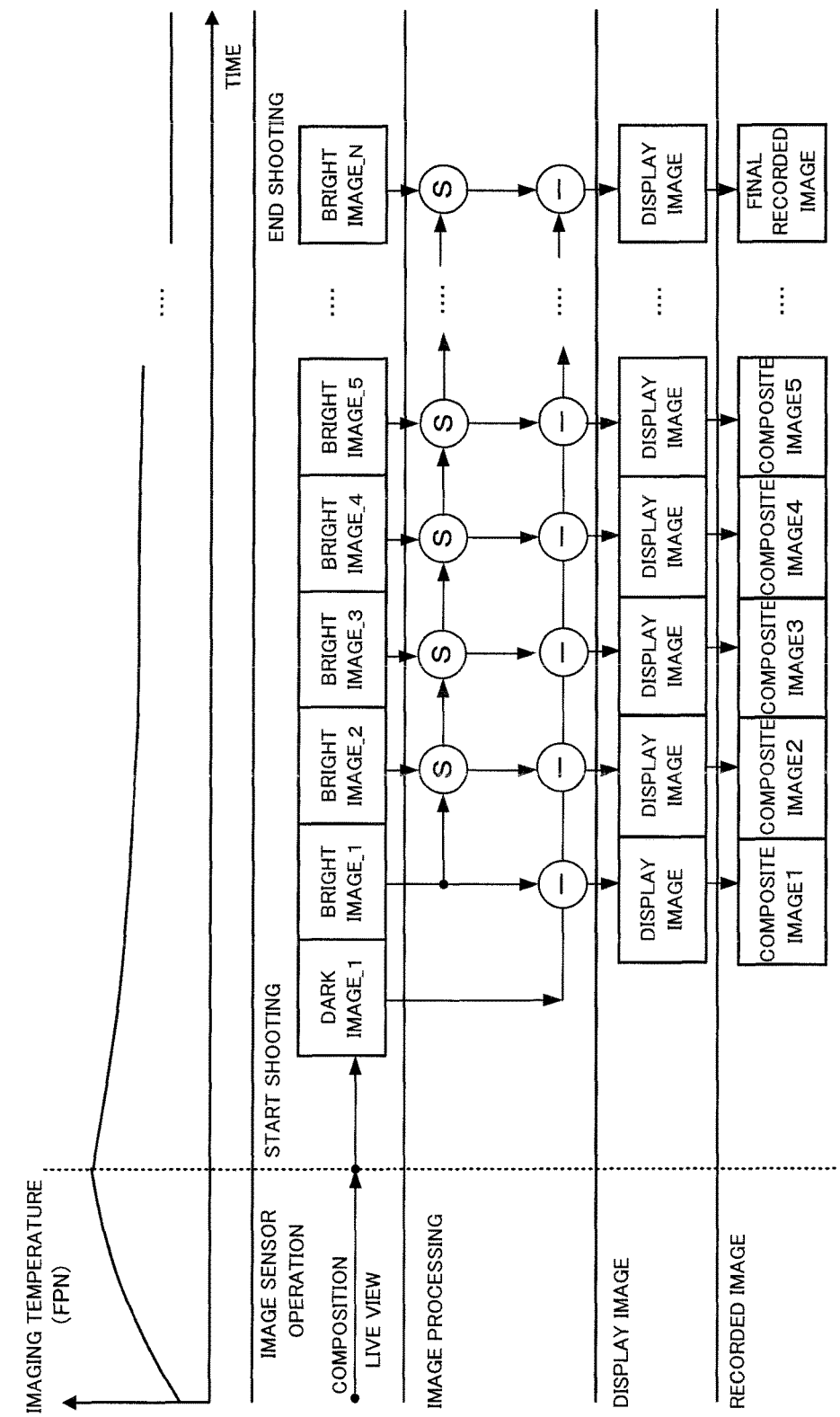
FIG. 4 is a timing chart illustrating an operation of a relatively bright composition processing in the camera according to the embodiment of the present invention.

In FIG. 4 illustrating the relatively bright composition processing, when shooting is started, the dark image_1 is obtained (see S7 in FIG. 2) and subsequently, the bright image_1 is obtained (S15). By using the image data of the bright image_1 and the dark image_1, the FPN processing is carried out (S25), and display is made on the basis of the image data subjected to the FPN processing and is also stored as a composite image_1 (S31). Subsequently, when the bright image_2 is obtained (S15), the FPN processing is carried out by using the dark image_1 (S25), and display is made on the basis of the image data subjected to the FPN processing and is stored as a composite image_2 (S31). After that, each time the bright image is obtained, the similar processing is carried out, and when the shooting is finished, a composite image_N subjected to this FPN processing for the lastly obtained bright image_N is displayed and recorded.

Figure 5:
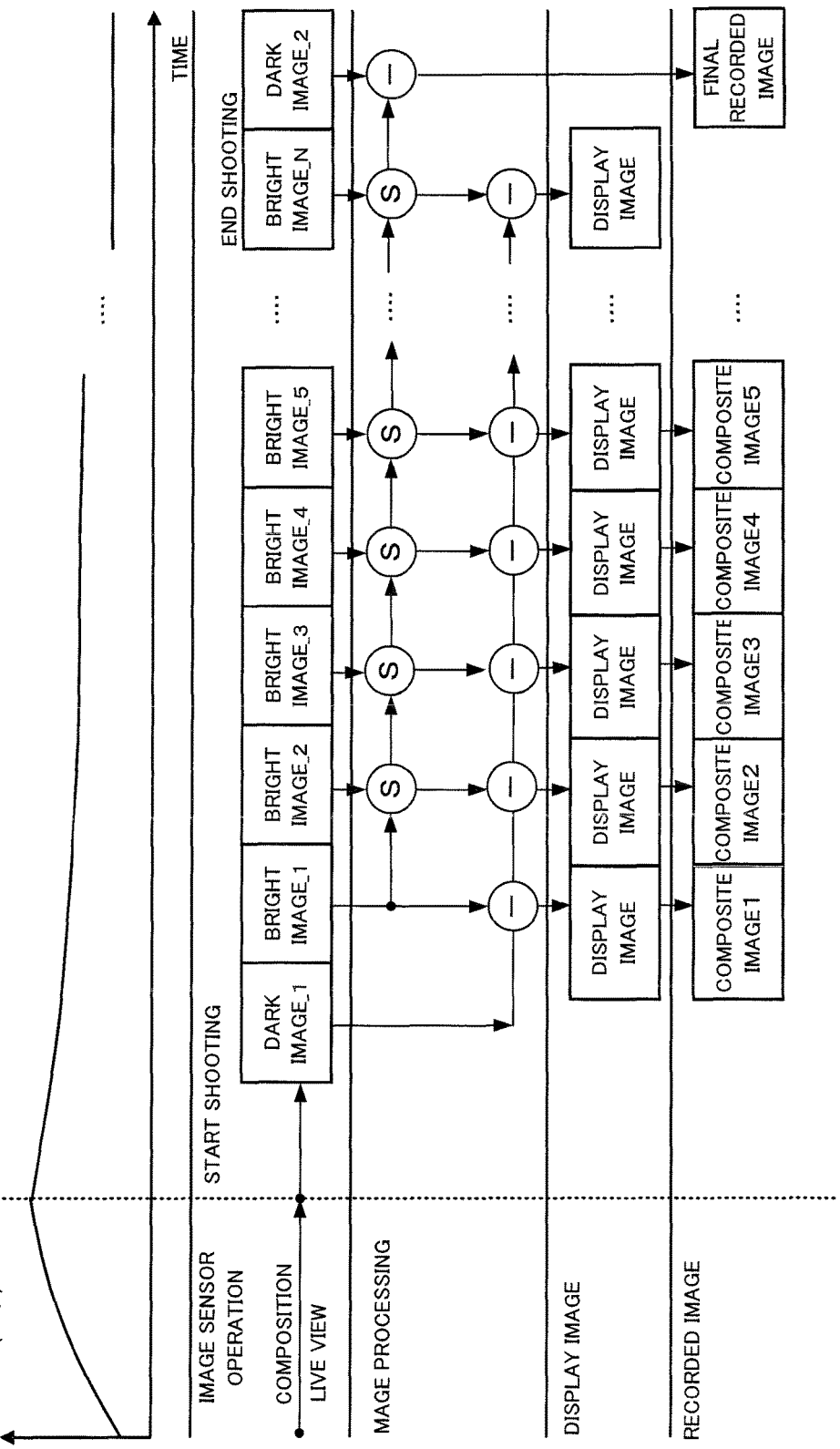
FIG. 5 is a timing chart illustrating an operation of a relatively dark composition processing in the camera according to the embodiment of the present invention.

In FIG. 5 illustrating the relatively dark composition processing, the processing is similar to the relatively bright composition processing from start of exposure to display of the image at the end of the exposure. At the end of the exposure, the composite image_N subjected to the FPN processing for the bright image_N obtained lastly is displayed and at the same time, the dark image_2 is obtained (S37 and S39 in FIG. 3). When the dark image_2 is obtained, the FPN processing is applied to the image data subjected to the relatively dark composition when the bright image_N is obtained by using the dark image_2, and the image data to which the FPN processing is applied is recorded as the final recoded image in the external memory 36.

Next, the fixed pattern noise (FPN) generated in an image in actual shooting will be described by using FIGS. 4 and 5. In the case of the same exposure time, if the temperature of the image sensor 4 at the time of shooting is higher, the FPN becomes larger. As illustrated in FIG. 4, during the live-view operation, with high-speed reading-out processing, image processing and display processing, the temperature of the image sensor 4 rises. After that, when the shooting is started, since the reading-out processing from the image sensor 4, image processing, and display processing are carried out in a cycle T slower than the frame rate of the live view, the temperature of the image sensor 4 gradually lowers from the start of the shooting. In this case, in the first read-out bright image_1 and the lastly shot bright image_N, the temperature is lower in shooting of the bright image_N and thus, the FPN is smaller.

In the relatively bright composition, since an output of the pixel with a larger pixel output is reflected as the pixel output, if exposure (brightness of the subject) of the images subjected to comparison and composition is equal, the pixel data of the image shot when the temperature is high (the noise is large) is reflected. That is, if the bright image_N is subjected to the relatively bright composition from the bright image_1, the FPN (fixed pattern noise) of the bright image_1 when the temperature is the highest is reflected in the composite image in general.

On the other hand, in the relatively dark composition, since an output of the pixel with a small pixel output is reflected as the pixel output as the result of the dark composition processing, if exposure (brightness of the subject) of the images subjected to comparison and composition is equal, the pixel data of the image shot when the temperature is low (the noise is small) is reflected. That is, if the bright image_N is subjected to the relatively dark composition from the bright image_1, the FPN (fixed pattern noise) of the dark image_N when the temperature is the lowest is reflected in the composite image in general.

Thus, as illustrated in FIGS. 4 and 5, in the relatively bright composition, the composite image from the bright image_1 to the bright image_N to be finally recorded has the FPN with a size close to that of the dark image by carrying out the FPN cancellation processing by the dark image_1 shot before first shooting of the bright image, and highly accurate FPN correction can be made. Moreover, by applying the FPN cancellation processing with the dark image leach time the bright image is combined, the FPN included in the image in the course of exposure can be also corrected.

Moreover, for the relatively dark composite image, by applying the FPN cancellation processing with the dark image_2 shot after shooting of the bright image for the composite image from the bright image_1 to the bright image_N, the size of the FPN of the composite image becomes close to that of the dark image, and highly accurate FPN correction can be made. Moreover, by applying the FPN cancellation processing with the dark image_1 each time the bright image is combined, the FPN included in the image in the course of exposure can be also corrected.

As described above, in the embodiment of the present invention, when the prolonged exposure such as the bulb exposure is to be carried out, before the shutter is opened so as to obtain the bright image, the dark image_1 is obtained in the state in which the shutter is shielded, and after the prolonged exposure is finished, the dark image_2 is obtained in the state in which the shutter is shielded. Then, if the relatively bright composition processing is to be carried out, the FPN processing is performed by using the dark image_1, while if the relatively dark composition processing is to be carried out, the FPN processing is performed by using the dark image_2. Thus, correction can be made so that the correction effect of the FPN cancellation is improved, and the image quality can be improved.

Next, a variation of the embodiment of the present invention will be described. When an environmental temperature changes during shooting, when the exposure time T is to be processed at a high speed, when the shooting is started immediately after the power of the camera is turned on, or when a heat radiation effect of the camera itself is low, even if the shooting is started, as illustrated in FIGS. 4 and 5, the temperature does not gradually lower but to the contrary, it is assumed to rise. In such a case, if it is corrected by the method as in the embodiment of the present invention, since the FPN included in the composite image is different from the FPN in the dark image, there is a concern that the correction is not made sufficiently. Thus, in this variation, the temperature of the image sensor 4 is monitored by a temperature sensor 5, the image sensor temperature during shooting is measured, and the dark image to be subjected to the FPN processing is selected.

In this variation, both in the relatively bright composition and the relatively dark composition, the dark image_1 shot before the shooting of the bright image and the dark image_2 shot after the shooting of the bright image are shot in advance, and the image sensor temperature during the shooting is detected in advance. In the relatively bright composition, a highest temperature T_hi during shooting of the bright image and a temperature T_1 at the time of shooting of the dark image_1 as well as a temperature T_2 at the time of shooting of the dark image_2 are compared, and by using the dark image with the temperature at the time of shooting closer to T_hi, the FPN cancellation processing of the final recorded image is carried out.

In the relatively dark composition, a lowest temperature T_Lo during the shooting of the bright image and the temperature T_1 at the time of shooting of the dark image_1 as well as the temperature T_2 at the time of shooting of the dark image_2 are compared, and by using the dark image with the temperature at the time of shooting closer to T_Lo, the FPN cancellation processing of the final recorded image is carried out.

As described above, in this variation, the temperature sensor 5 for detecting the temperature of the image sensor 4 when the first image data and the second image data are obtained is provided, and the fixed pattern noise (FPN) is corrected on the basis of the temperature detected by the temperature sensor 5. Thus, the sizes of the fixed pattern noises (FPN) of the composite image and the dark image are close to each other, and the FPN cancellation processing with high correction accuracy can be made.

As described above, the camera (imaging apparatus) according to the embodiment or the variation of the present invention carries out the relatively bright composition processing by the following processing. That is, the camera repeatedly and sequentially performs relatively bright composition processing on second image data in a second frame and after generated on the basis of image data read out of an image sensor, the relatively bright composition processing: (1) storing first image data generated first on the basis of the image data (S15 in FIG. 2, for example) read out of the image sensor (the image sensor 4, for example) as cumulative relatively bright composite image data; (2) comparing respective corresponding pixel data of a plurality of pieces of pixel data constituting the second image data generated on the basis of the image data read out of the image sensor and of a plurality of pieces of pixel data constituting the cumulative relatively bright composite image data; and (3) reconstructing the cumulative relatively bright composite image data using the larger pixel data as new pixel data (see S21 in FIG. 2 and FIG. 4, for example).

Moreover, the camera (imaging apparatus) according to the embodiment or the variation of the present invention carries out the relatively dark composition processing by the following processing. That is, the camera repeatedly and sequentially performs relatively dark composition processing on second image data in a second frame and after generated on the basis of image data read out of an image sensor, the relatively dark composition processing: (1) storing first image data generated first on the basis of the image data (S15 in FIG. 2, for example) read out of the image sensor (the image sensor 4) as cumulative relatively dark composite image data; (2) comparing respective corresponding pixel data of a plurality of pieces of pixel data constituting the second image data generated on the basis of the image data read out of the image sensor and of a plurality of pieces of pixel data constituting the cumulative relatively dark composite image data; and (3) reconstructing the cumulative relatively dark composite image data using the smaller pixel data as new pixel data (see S21 in FIG. 2 and FIG. 5, for example).

Moreover, the camera (imaging apparatus) according to the embodiment or the variation of the present invention includes the dark image data imaging section (the mechanical shutter 3, the image sensor 4, the system control section 20 and the like, for example) that obtains the dark image data before the first image data is obtained or after the second image data obtained lastly, in the state in which the light beams entering the imaging surface of the image sensor are shielded and the correcting section (the FPN cancellation processing section 12, for example) that corrects the fixed pattern noise in the cumulative relatively bright composite image data by using the dark image data. Moreover, the correcting section corrects the fixed pattern noise in the cumulative relatively bright composite image data by using the dark image data obtained at a time closest to the time when a temperature of the image sensor when the first image data or the second image data is obtained is assumed to be the highest in the dark image data obtained before the first image data is obtained or the dark image data obtained after the second image data obtained lastly (S25 in FIG. 2, for example). Thus, when the image signal continuously read out of the image sensor is subjected to the relatively bright composition so as to generate the exposure image, the correction can be made so that the correction effect of the FPN cancellation is improved, and the image quality can be improved.

Moreover, the camera (imaging apparatus) according to the embodiment or the variation of the present invention assumes that the temperature of the image sensor when the first image data is obtained is the highest. That is, when the relatively bright composition is carried out, the dark image_1 obtained before the bright image is shot is used, assuming it to be the dark image obtained when the temperature of the image sensor is the highest. In an embodiment in which the time of the highest temperature of the image sensor is assumed, the temperature sensor 5 is not strictly necessary for relatively bright composition processing.

Moreover, the camera (imaging apparatus) according to the embodiment or the variation of the present invention includes the temperature sensor 5 that detects the temperature of the image sensor when the first image data, the second image data, and the dark image data are obtained, and the correcting section (the FPN cancellation processing section 12, for example) corrects the fixed pattern noise (FPN) on the basis of the temperature detected by the temperature sensor 5. Thus, correction of the fixed pattern noise corresponding to the actual temperature change can be made.

Moreover, the camera (imaging apparatus) according to the embodiment or the variation of the present invention includes the dark image data imaging section (the mechanical shutter 3, the image sensor 4, the system control section 20 and the like, for example) that obtains the dark image data before the first image data is obtained or after the second image data obtained lastly, in the state in which the light beams entering the imaging surface of the image sensor are shielded and the correcting section (the FPN cancellation processing section 12, for example) that corrects the fixed pattern noise in the cumulative relatively dark composite image data by using the dark image data. Moreover, the correcting section corrects the fixed pattern noise in the cumulative relatively bright composite image data by using the dark image data obtained at a time closest to the time when a temperature of the image sensor when the first image data or the second image data is obtained is assumed to be the lowest in the dark image data obtained before the first image data is obtained or the dark image data obtained after the second image data obtained lastly (S41 in FIG. 3, for example). Thus, when the image signal continuously read out of the image sensor is subjected to the relatively dark composition so as to generate the exposure image, the correction can be made so that the correction effect of the FPN cancellation is improved, and the image quality can be improved. In an embodiment in which the time of the lowest temperature of the image sensor is assumed, the temperature sensor 5 is not strictly necessary for relatively dark composition processing.

Moreover, the camera (imaging apparatus) according to the embodiment or the variation of the present invention assumes that the temperature of the image sensor when the second image data is obtained is the lowest. That is, when the relatively dark composition is carried out, the dark image_2 obtained after the last bright image is shot is used, assuming it to be the dark image obtained when the temperature of the image sensor is the lowest.

Figure 3:
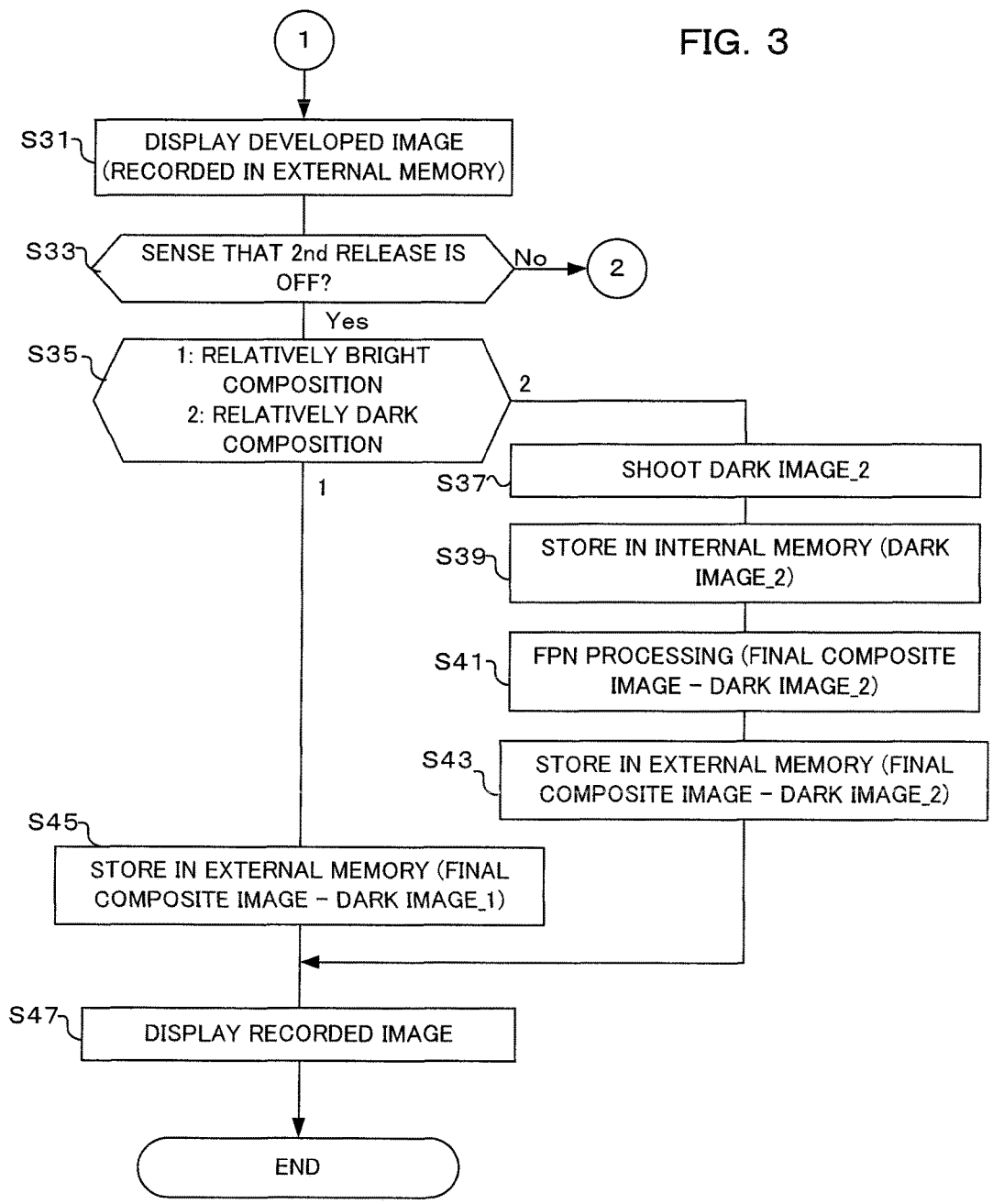
FIG. 3 is a flowchart illustrating an operation when a comparison and composition mode is set in the camera according to the embodiment of the present invention.

Moreover, in the camera (imaging apparatus) according to the embodiment or the variation of the present invention, the correcting section (the FPN cancellation processing section 12, for example) corrects the fixed pattern noise in the cumulative comparison and composite image data by using the dark image data (dark image_1, for example) obtained before the first image data is obtained (S25 in FIG. 2, for example), and the imaging apparatus displays an image represented by the cumulative comparison and composite image data whose fixed pattern noise is corrected (S31 in FIG. 3, for example). Thus, when the image being combined is sequentially subjected to live-view display as sequential progressive exposure or is stored as the image currently being processed, the fixed pattern noise in the live-view image and the image currently being processed can be corrected. That is, by carrying out the FPN cancellation for the image being combined by using the dark image shot before shooting of the bright image, the image quality of the live-view display and a recorded image currently being processed can be also improved.

In the embodiment or the variation of the present invention, the shooting is started by pressing on the release button and stopped by releasing the pressing, but this is not limiting, and it may be naturally so constituted that the shooting is started by pressing on the release button, is continued even if the pressing is released once the shooting is started, and is stopped by pressing on the release button again.

In the embodiment or the variation of the present invention, the relatively bright composition and the relatively dark composition can be both set, but this is not limiting, and it may be only either one of them or it may be only the relatively bright or only the relatively dark for the progress display in the course of bulb exposure or an addition image may be simply displayed.

In the embodiment or the variation of the present invention, a digital camera is used as a device for shooting in description, but a digital single-lens reflex camera or a compact digital camera may be used as a camera, a camera for a moving picture such as a video camera and a movie camera may be also used and moreover, it may be a camera incorporated in a mobile phone, a smart phone, a PDA (Personal Digital Assist), a game device or the like. In any case, the present invention can be applied to any device as long as it is a device for shooting capable of prolonged exposure.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus that repeatedly and sequentially performs relatively bright composition processing on second image data in a second frame and after generated on the basis of image data read out of an image sensor, the relatively bright composition processing storing first image data generated first on the basis of the image data read out of the image sensor as cumulative relatively bright composite image data, comparing respective corresponding pixel data of a plurality of pieces of pixel data constituting the second image data generated on the basis of the image data read out of the image sensor and of a plurality of pieces of pixel data constituting the cumulative relatively bright composite image data, and reconstructing the cumulative relatively bright composite image data using a larger one of pixel data between the respective corresponding pixel data pixel data as new pixel data, the imaging apparatus comprising:
a dark image data imaging circuit that obtains dark image data in a state in which light beams entering an imaging surface of the image sensor are shielded; and
a correcting circuit that corrects a fixed pattern noise in the cumulative relatively bright composite image data by using dark image data after the cumulative relatively bright composite image data are reconstructed.

2. The imaging apparatus according to claim 1, comprising
a display for displaying the cumulative relatively bright composite image data obtained by correcting the fixed pattern noise with the correcting circuit by using the dark image data.

3. The imaging apparatus according to claim 1, comprising
a memory for storing the cumulative relatively bright composite image data obtained by correcting the fixed pattern noise with the correcting circuit by using the dark image data.

4. The imaging apparatus according to claim 1,
wherein a moving picture is generated from the cumulative relatively bright composite image data obtained by correcting the fixed pattern noise with the correcting circuit by using the dark image data.

5. An imaging apparatus that repeatedly and sequentially performs relatively dark composition processing on second image data in a second frame and after generated on the basis of image data read out of an image sensor, the relatively dark composition processing storing first image data generated first on the basis of the image data read out of the image sensor as cumulative relatively dark composite image data, comparing respective corresponding pixel data of a plurality of pieces of pixel data constituting the second image data generated on the basis of the image data read out of the image sensor and of a plurality of pieces of pixel data constituting the cumulative relatively dark composite image data, and reconstructing the cumulative relatively dark composite image data using a smaller one of pixel data between the respective corresponding pixel data as new pixel data, the imaging apparatus comprising:
a dark image data imaging circuit that obtains dark image data in a state in which light beams entering an imaging surface of the image sensor are shielded; and
a correcting circuit that corrects a fixed pattern noise in the cumulative relatively dark composite image data by using dark image data after the cumulative relatively dark composite image data are reconstructed.

6. The imaging apparatus according to claim 5, comprising
a display for displaying the cumulative relatively bright composite image data obtained by correcting the fixed pattern noise with the correcting circuit by using the dark image data.

7. The imaging apparatus according to claim 5, comprising
a memory for storing the cumulative relatively bright composite image data obtained by correcting the fixed pattern noise with the correcting circuit by using the dark image data.

8. The imaging apparatus according to claim 5,
wherein a moving picture is generated from the cumulative relatively bright composite image data obtained by correcting the fixed pattern noise with the correcting circuit by using the dark image data.

9. An imaging method that repeatedly and sequentially performs relatively bright composition processing on second image data in a second frame and after generated on the basis of image data read out of an image sensor, the relatively bright composition processing storing first image data generated first on the basis of the image data read out of the image sensor as cumulative relatively bright composite image data, comparing respective corresponding pixel data of a plurality of pieces of pixel data constituting the second image data generated on the basis of the image data read out of the image sensor and of a plurality of pieces of pixel data constituting the cumulative relatively bright composite image data, and reconstructing the cumulative relatively bright composite image data using a larger one of pixel data between the respective corresponding pixel data as new pixel data, the imaging method comprising:

a dark image data imaging step of obtaining dark image data in a state in which light beams entering an imaging surface of the image sensor are shielded; and a correcting step of correcting a fixed pattern noise in the cumulative relatively bright composite image data by using dark image data after the cumulative relatively bright composite image data are reconstructed.

10. An imaging method that repeatedly and sequentially performs relatively dark composition processing on second image data in a second frame and after generated on the basis of image data read out of an image sensor, the relatively dark composition processing storing first image data generated first on the basis of the image data read out of the image sensor as cumulative relatively dark composite image data, comparing respective corresponding pixel data of a plurality of pieces of pixel data constituting the second image data generated on the basis of the image data read out of the image sensor and of a plurality of pieces of pixel data constituting the cumulative relatively dark composite image data, and reconstructing the cumulative relatively dark composite image data using a smaller one of pixel data between the respective corresponding pixel data as new pixel data, the imaging method comprising:

a dark image data imaging step of obtaining dark image data in a state in which light beams entering an imaging surface of the image sensor are shielded; and a correcting step of correcting a fixed pattern noise in the cumulative relatively dark composite image data by using dark image data after the cumulative relatively bright composite image data are reconstructed.

11. A non-transitory computer readable storage medium storing processor executable code, which when executed by at least one processor, performs an imaging method that repeatedly and sequentially performs relatively bright composition processing on second image data in a second frame and after generated on the basis of image data read out of an image sensor, the relatively bright composition processing storing first image data generated first on the basis of the image data read out of the image sensor as cumulative relatively bright composite image data, comparing respective corresponding pixel data of a plurality of pieces of pixel data constituting the second image data generated on the basis of the image data read out of the image sensor and of a plurality of pieces of pixel data constituting the cumulative relatively bright composite image data, and reconstructing the cumulative relatively bright composite image data using a larger one of pixel data between the respective corresponding pixel data as new pixel data, the imaging method comprising:

a dark image data imaging step of obtaining dark image data in a state in which light beams entering an imaging surface of the image sensor are shielded; and a correcting step of correcting a fixed pattern noise in the cumulative relatively bright composite image data by using dark image data after the cumulative relatively bright composite image data are reconstructed.

12. A non-transitory computer readable storage medium storing processor executable code, which when executed by at least one processor, performs an imaging method that repeatedly and sequentially performs relatively dark composition processing on second image data in a second frame and after generated on the basis of image data read out of an image sensor, the relatively dark composition processing storing first image data generated first on the basis of the image data read out of the image sensor as cumulative relatively dark composite image data, comparing respective corresponding pixel data of a plurality of pieces of pixel data constituting the second image data generated on the basis of the image data read out of the image sensor and of a plurality of pieces of pixel data constituting the cumulative relatively dark composite image data, and reconstructing the cumulative relatively dark composite image data using a smaller one of pixel data between the respective corresponding pixel data as new pixel data, the imaging method comprising:

a dark image data imaging step of obtaining dark image data in a state in which light beams entering an imaging surface of the image sensor are shielded; and a correcting step of correcting a fixed pattern noise in the cumulative relatively dark composite image data by using dark image data after the cumulative relatively bright composite image data are reconstructed.

* * * * *